US012252838B2

(12) United States Patent
Lee et al.

(10) Patent No.: US 12,252,838 B2
(45) Date of Patent: Mar. 18, 2025

(54) LAUNDRY TREATING APPARATUS

(71) Applicant: LG ELECTRONICS INC., Seoul (KR)

(72) Inventors: Donghwan Lee, Seoul (KR); Myungshik Kim, Seoul (KR); Jeaseok Seong, Seoul (KR); Sungkyong Han, Seoul (KR); Junyi Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/242,366

(22) Filed: Sep. 5, 2023

(65) Prior Publication Data

US 2023/0407552 A1 Dec. 21, 2023

Related U.S. Application Data

(63) Continuation of application No. 17/841,421, filed on Jun. 15, 2022, now Pat. No. 11,781,264, which is a (Continued)

(30) Foreign Application Priority Data

Sep. 6, 2018 (KR) ........................ 10-2018-0106542
Sep. 6, 2018 (KR) ........................ 10-2018-0106543

(51) Int. Cl.

*D06F 73/02* (2006.01)
*D06F 105/54* (2020.01)
*F21V 23/04* (2006.01)

(52) U.S. Cl.

CPC .......... *D06F 73/02* (2013.01); *F21V 23/0485* (2013.01); *D06F 2105/54* (2020.02)

(58) Field of Classification Search

CPC ...... D06F 73/02; D06F 2105/54; D06F 71/10; D06F 71/29; D06F 58/10; D06F 58/20;
(Continued)

(56) References Cited

U.S. PATENT DOCUMENTS 3,739,496 A * 6/1973 Buckley .................. D06F 73/02 312/271
5,509,572 A * 4/1996 Curtis ....................... G07F 7/00 414/268
(Continued)

FOREIGN PATENT DOCUMENTS

CN 1170061 A 1/1998
CN 104294529 A 1/2015
(Continued)

OTHER PUBLICATIONS

Chinese Office Action in Chinese Application No. 201910842507.4 dated Apr. 29, 2021 (pp. 1-7) (English Translation pp. 1-6).
(Continued)

*Primary Examiner* — Abdullah A Riyami
*Assistant Examiner* — Syed M Kaiser
(74) *Attorney, Agent, or Firm* — Birch, Stewart, Kolasch & Birch, LLP

(57) ABSTRACT

A laundry treating apparatus includes a cabinet, and a laundry receiving space in the cabinet that provides a space for accommodate laundry. A laundry introduction opening in a front surface of the cabinet and communicating with the laundry receiving space, a door coupled to the cabinet and configured to open and close the laundry receiving space, a supply unit configured to supply at least one of air or water to the laundry receiving space, and a presser configured to form creases of pants or unfold wrinkles of pants. The presser includes a housing on the laundry receiving space, a housing chamber in the housing that provides a space in which pants are secured thereto, a housing door rotatably coupled to the housing and configured to open and close the housing chamber, and a housing guide configured to withdraw the housing from the laundry receiving space through the laundry introduction opening.

10 Claims, 6 Drawing Sheets

Related U.S. Application Data continuation of application No. 16/561,550, filed on Sep. 5, 2019, now Pat. No. 11,377,782.

(58) Field of Classification Search
CPC ...... D06F 58/203; D06F 58/206; D06F 58/26; D06F 58/12; F21V 23/0485
See application file for complete search history.

(56) References Cited

U.S. PATENT DOCUMENTS

| | | | | |
|---|---|---|---|---|
| 7,886,971 | B2 * | 2/2011 | Cassady | G06Q 10/06 235/383 |
| 9,120,624 | B1 * | 9/2015 | Cassady | G06Q 10/0836 |
| 11,377,782 | B2 * | 7/2022 | Lee | F21V 23/0485 |
| 11,781,264 | B2 * | 10/2023 | Lee | D06F 73/02 68/5 C |
| 2007/0251990 | A1 * | 11/2007 | LeNorman | G07F 17/20 235/375 |
| 2009/0302105 | A1 * | 12/2009 | Cassady | D06F 95/00 235/381 |
| 2013/0047677 | A1 * | 2/2013 | Han | D06F 39/14 68/27 |
| 2014/0317948 | A1 | 10/2014 | Lee et al. | |
| 2016/0208429 | A1 * | 7/2016 | Park | D06F 71/026 |
| 2017/0342650 | A1 * | 11/2017 | Mainini | D06F 59/02 |
| 2018/0148887 | A1 | 5/2018 | Choi et al. | |
| 2018/0163342 | A1 * | 6/2018 | Kitagawa | D06F 89/00 |
| 2019/0120546 | A1 * | 4/2019 | Hong | G01D 5/02 |
| 2020/0268148 | A1 * | 8/2020 | Kim | F25D 31/00 |

FOREIGN PATENT DOCUMENTS

| | | | |
|---|---|---|---|
| CN | 204825403 | U | 12/2015 |
| CN | 106068431 | A | 11/2016 |
| CN | 106192334 | A | 12/2016 |
| CN | 108252056 | A | 7/2018 |
| CN | 108486389 | A | 9/2018 |
| EP | 2 826 911 | A1 | 1/2015 |
| EP | 3 086 061 | A1 | 10/2016 |
| EP | 3168557 | A1 | 5/2017 |
| EP | 3252209 | A1 | 12/2017 |
| EP | 3 321 415 | A1 | 5/2018 |
| EP | 3321414 | A1 | 5/2018 |
| JP | 49-38249 | A | 4/1974 |
| JP | 58-73146 | U | 5/1983 |
| JP | 61-43416 | U | 3/1986 |
| JP | 1-308597 | A | 12/1989 |
| JP | 2-134997 | U | 11/1990 |
| JP | 11-47497 | A | 2/1999 |
| JP | 2018-13857 | A | 1/2018 |
| JP | 2018-503430 | A | 2/2018 |
| KR | 10-2005-0035390 | A | 4/2005 |
| KR | 10-2008-0007868 | A | 1/2008 |
| KR | 10-0809580 | B1 | 3/2008 |
| KR | 10-2010-0008273 | A | 1/2010 |
| KR | 10-2010-0022799 | A | 3/2010 |
| KR | 10-2011-0048343 | A | 5/2011 |
| KR | 10-2011-0067837 | A | 6/2011 |
| KR | 10-1318359 | B1 | 10/2013 |
| KR | 10-2015-0009718 | A | 1/2015 |
| KR | 10-2016-0150575 | A | 12/2016 |
| KR | 10-2017-0084454 | A | 7/2017 |
| KR | 10-1820859 | B1 | 1/2018 |
| KR | 10-2018-0052953 | A | 5/2018 |
| RU | 2 448 209 | C2 | 4/2012 |
| RU | 2467107 | C1 | 11/2012 |

OTHER PUBLICATIONS

European Search Report for corresponding European Patent Application No. 19195,364, dated Nov. 25, 2019 (10 pages).
Notice of Allowance in Russian Application No. 2021107565 dated Aug. 9, 2021 (10 pages).
Office Action in Indian Application No. 202117009878 dated Aug. 31, 2021 (5 pages).
PCT International Search Report for corresponding International Application No. PCT/KR2019/011387, dated Jan. 16, 2020 (8 pages).

* cited by examiner

LAUNDRY TREATING APPARATUS

CROSS-REFERENCE TO RELATED APPLICATIONS

This application is a Continuation of U.S. application Ser. No. 17/841,421, filed on Jun. 15, 2022, which is a Continuation of U.S. application Ser. No. 16/561,550, filed on Sep. 5, 2019 (now U.S. Pat. No. 11,377,782, issued on Jul. 5, 2022), which claims the benefit of priority of Korean Patent Application Nos. 10-2018-0106542, filed on Sep. 6, 2018, and 10-2018-0106543, filed on Sep. 6, 2018, the contents of all of which are hereby incorporated by reference in their entireties as if fully set forth herein.

BACKGROUND

The present disclosure relates to a laundry treatment apparatus.

In general, a laundry treatment apparatus is a home appliance configured to perform such diverse treatment processes that are related to laundry (e.g., washing, drying, deodorizing, wrinkle-removing and the like). The laundry treatment apparatus means a concept including a washing machine for washing laundry, a dryer for drying wet laundry and a refresher for deodorizing the bad smell pervaded in laundry or removing wrinkles in the laundry.

A conventional laundry treatment apparatus includes a drum for accommodating laundry; and a drive unit provided to rotate the drum; and a mechanism configured to supply air to the drum. Such a conventional laundry treatment apparatus actuates the laundry treating processes while generating a frictional power between the laundry and the drum. Accordingly, the conventional apparatus is advantageous in drying laundry but disadvantageous in preventing or removing wrinkles in the laundry.

SUMMARY

Exemplary embodiments of the present disclosure may address the above-noted and other problems and provide a laundry treatment apparatus which may facilitate drying, deodorizing and wrinkle-removing by providing a laundry support unit configured to fix laundry in a state of being spread.

Exemplary embodiments may also provide a laundry treatment apparatus which may allow a user to check the laundry treating process outside.

Exemplary embodiments may also provide a laundry treatment apparatus which may improve use convenience by providing a laundry support unit configured to move a hanger having laundry hung thereon towards an opening once a door is open.

To achieve these objects and other advantages and in accordance with the purpose of the disclosure, as embodied and discussed herein, a laundry treatment apparatus may comprise a cabinet; a laundry receiving space provided in the cabinet and providing a predetermined space for accommodating laundry; a laundry introduction opening provided in a front surface of the cabinet and formed in communication with the laundry receiving space; a supply unit configured to supply at least one of air and vapors to the laundry receiving space; a laundry support unit movably coupled to the cabinet and having a hanger hung thereon; a door body rotatably coupled to the cabinet and configured to open and close the laundry introduction opening; a window provided in a body through hole penetrating the door body and made of a transparent material; a knock sensing unit configured to sense at least one of a sound or vibration that is generated when a user is knocks or taps; and a lamp configured to emit light to the inside of the laundry receiving space when the knock sensing unit senses the sound or vibration generated when the window is knocked.

The laundry treatment apparatus may further comprise a door sensing unit configured to sense whether the door body opens the laundry introduction opening; and a conveying part configured to move the laundry support unit towards the laundry introduction opening when the door body opens the laundry introduction opening and move the laundry support unit away from the laundry introduction opening when the door body closes the laundry introduction opening.

The laundry treatment apparatus may further comprise a control unit configured to deactivate the knock sensing unit and actuate the lamp when it is sensed that the door body opens the laundry introduction opening.

The laundry treatment apparatus may further comprise a control unit configured to actuate the lamp when the knock sensing unit senses the sound or vibration generated when the window is knocked in a state of sensing that the door body closes the laundry introduction opening.

When the door opens the laundry introduction opening, a distance from the laundry introduction opening to the center of the support body may be set to be a third (⅓) of the length of the laundry receiving space that is in parallel with a moving direction of the laundry support unit, and when the door closes the laundry introduction opening, a distance from the laundry introduction opening to the center of the laundry support unit may be set to be a half (½) or more of the length of the laundry receiving space that is in parallel with the moving direction of the laundry support unit.

The laundry treatment apparatus may further comprise a first chamber provided in an upper area of the laundry receiving space and configured to communicate with the laundry receiving space via a first slit and a second slit, wherein the laundry support unit comprises a base provided in the first chamber and configured to reciprocate between a front surface of the cabinet and a rear surface; a first connecting part having one end fixed to the base and a free end inserted in the first slit to be located in the laundry receiving space; a second connecting part having one end fixed to the base and a free end inserted in the second slit to be located in the laundry receiving space; and a support bar having one end fixed to the first connecting part and the other end fixed to the second connecting part and configured to support a hanger.

The conveying part may comprise a rack provided in the base to be in parallel with the moving direction of the base; and a pinion coupled to the rack; and a pinion motor configured to rotate the pinion.

The lamp may be provided in the support bar.

The laundry treatment apparatus may further comprise a state sensing unit configured to measure humidity or temperatures of the laundry receiving space, wherein when the knock sensing unit senses the sound or vibration generated when the window is knocked in a state where the door body closes the laundry introduction opening, the lamp emits respective different color lights according to the amount of the foreign substances sensed by the state sensing unit.

The laundry treatment apparatus may further comprise a state sensing unit configured to measure the amount of the foreign substances contained in the air inside the laundry receiving space, wherein when the knock sensing unit senses the sound or vibration generated when the window is knocked in a state where the door body closes the laundry introduction opening, the lamp emits respective different color lights according to the amount of the foreign substances sensed by the state sensing unit.

The laundry treatment apparatus may further comprise a state sensing unit configured to sense the concentration of the smell particles contained in the air inside the laundry receiving space, wherein when the knock sensing unit senses the sound or vibration generated when the window is knocked in a state where the door body closes the laundry introduction opening, the lamp emits respective different color lights according to the concentration of the smell particles sensed by the state sensing unit.

The laundry treatment apparatus may further comprise a housing that is withdrawable from the laundry receiving space via the laundry introduction opening when the door body opens the laundry introduction opening; a housing chamber provided in the housing and providing a predetermined space for accommodating the laundry; a housing opening in communication with the housing chamber via the housing; a housing door rotatably coupled to the housing and configured to open and close the housing opening; a supporting part provided in the housing chamber or the housing door and having pants secured thereto; and a pants-pressing part provided in the other one of the housing chamber and the housing door and configured to press the pants towards the pants-supporting part when the housing door closes the housing opening.

The pants-supporting part may comprise a laundry securing part provided in the housing chamber and having one end of the pants detachably secured thereto; and a support body provided in the housing chamber and configured to support one surface of the pants fixed to the laundry securing part, and the pants-pressing part comprises a pressing body provided in the housing door and configured to press the pants towards the support body when the housing door closes the housing opening.

The laundry treatment may further comprise an inlet hole penetrating the housing and configured to facilitate communication between the laundry receiving space and the housing chamber; an air supply unit configured to supply heated-air to the laundry receiving space; and a moisture supply unit configured to supply unheated vapors or heated-vapors to the laundry receiving space.

The laundry treatment may further comprise a housing inlet hole penetrating the housing and configured to facilitate communication between the laundry receiving space and the housing chamber.

The supply unit may comprise an air supply unit configured to supply heated-air to the laundry receiving space; and a moisture supply unit configured to supply unheated vapors or heated-vapors to the laundry receiving space.

The laundry treatment apparatus may further comprise an avoiding groove provided in at least one of the support body and the pressing body and providing a predetermined space for accommodating a sewing line formed in the pants.

The laundry treatment apparatus may further comprise a hinge provided to rotatably couple the housing door to the housing, wherein the hinge comprises a hinge body provided in a bar shape; a first shaft provided to connect one end of the hinge body to the housing; and a second shaft provided to connect the other end of the hinge body to the housing door.

The laundry treatment apparatus may further comprise a lamp provided in the support bar and configured to emit light when the door opens the laundry introduction opening.

The laundry securing part may be a clip having one end secured to a surface of the support body and a free end pressing the pants to the surface of the support body by using elasticity.

In another aspect, a laundry treatment apparatus comprises a cabinet; a laundry receiving space provided in the cabinet and providing a predetermined space for accommodating laundry; a laundry introduction opening provided in a front surface of the cabinet and formed in communication with the laundry receiving space; a door rotatably coupled to the cabinet and configured to open and close the laundry introduction opening; a supply unit configured to supply at least one of air and vapors to the laundry receiving space; a laundry support unit movably coupled to the cabinet and having a hanger hung thereon; a housing that is withdrawable from the laundry receiving space via the laundry introduction opening when the door body opens the laundry introduction opening; a housing chamber provided in the housing and providing a predetermined space for accommodating the laundry; a housing opening in communication with the housing chamber via the housing; a housing door rotatably coupled to the housing and configured to open and close the housing opening; a pants-supporting part provided in the housing chamber or the housing door and having pants secured thereto; and a pants-pressing part provided in the other one of the housing chamber and the housing door and configured to press the pants towards the supporting part when the housing door closes the housing opening.

The pants-supporting part may comprise a laundry securing part provided in the housing chamber and having one end of the pants detachably secured thereto; and a support body provided in the housing chamber and configured to support one surface of the pants fixed to the laundry securing part, and the pants-pressing part comprises a pressing body provided in the housing door and configured to press the pants towards the support body when the housing door closes the housing opening.

The laundry treatment apparatus may further comprise a housing inlet hole penetrating the housing and configured to facilitate communication between the laundry receiving space and the housing chamber.

The supply unit may comprise an air supply unit configured to supply heated-air to the laundry receiving space; and a moisture supply unit configured to supply unheated vapors or heated-vapors to the laundry receiving space.

The laundry treatment apparatus may further comprise an avoiding groove provided in at least one of the support body and the pressing body and providing a predetermined space for accommodating a sewing line formed in the pants.

The laundry treatment apparatus may further comprise a hinge provided to rotatably couple the housing door to the housing, wherein the hinge comprises a hinge body provided in a bar shape; a first shaft provided to connect one end of the hinge body to the housing; and a second shaft provided to connect the other end of the hinge body to the housing door.

The laundry treatment apparatus may further comprise a door sensing unit configured to sense whether the door body opens the laundry introduction opening; and a conveying part configured to move the laundry support unit towards the laundry introduction opening when the door body opens the laundry introduction opening and move the laundry support unit away from the laundry introduction opening when the door body closes the laundry introduction opening.

When the door opens the laundry introduction opening, a distance from the laundry introduction opening to the center of the support body may be set to be a third (⅓) of the length of the laundry receiving space that is in parallel with a moving direction of the laundry support unit, and when the door closes the laundry introduction opening, a distance from the laundry introduction opening to the center of the laundry support unit may be set to be a half (½) or more of the length of the laundry introduction space that is in parallel with the moving direction of the laundry support unit.

The laundry treatment apparatus may further a first chamber provided in an upper area of the laundry receiving space and configured to communicate with the laundry receiving space via a first slit and a second slit, wherein the laundry support unit comprises a base provided in the first chamber and configured to reciprocate between a front surface of the cabinet and a rear surface; a first connecting part having one end fixed to the base and a free end inserted in the first slit to be located in the laundry receiving space; a second connecting part having one end fixed to the base and a free end inserted in the second slit to be located in the laundry receiving space; and a support bar having one end fixed to the first connecting part and the other end fixed to the second connecting part and configured to support a hanger.

The laundry treatment apparatus may further comprise a lamp provided in the support bar and configured to emit light when the door opens the laundry introduction opening.

The conveying part comprises a rack provided in the base to be in parallel with the moving direction of the base; and a pinion coupled to the rack; and a pinion motor configured to rotate the pinion.

As is apparent from the above description, exemplary embodiments of the present disclosure may have the effect of providing a laundry treatment apparatus which may facilitate drying, deodorizing and wrinkle-removing by providing a laundry support unit configured to fix laundry in a state of being spread.

In addition, exemplary embodiments of the present disclosure may have the effect of providing a laundry treatment apparatus which may allow a user to check the laundry treating process from the outside.

In addition, exemplary embodiments of the present disclosure may have the effect of providing a laundry treatment apparatus which may improve use convenience by providing a laundry support unit configured to move a hanger having laundry hung thereon towards an opening once a door is open.

DETAILED DESCRIPTION

Reference will now be made in detail to exemplary embodiments of the present disclosure, examples of which are illustrated in the accompanying drawings. It should be noted herein that construction of an apparatus, which will hereinafter be described, and a control method of the apparatus are given only for illustrative purposes and the protection scope of the invention is not limited thereto. Wherever possible, the same reference numbers will be used throughout the drawings to refer to the same or like parts.

Figure 1:
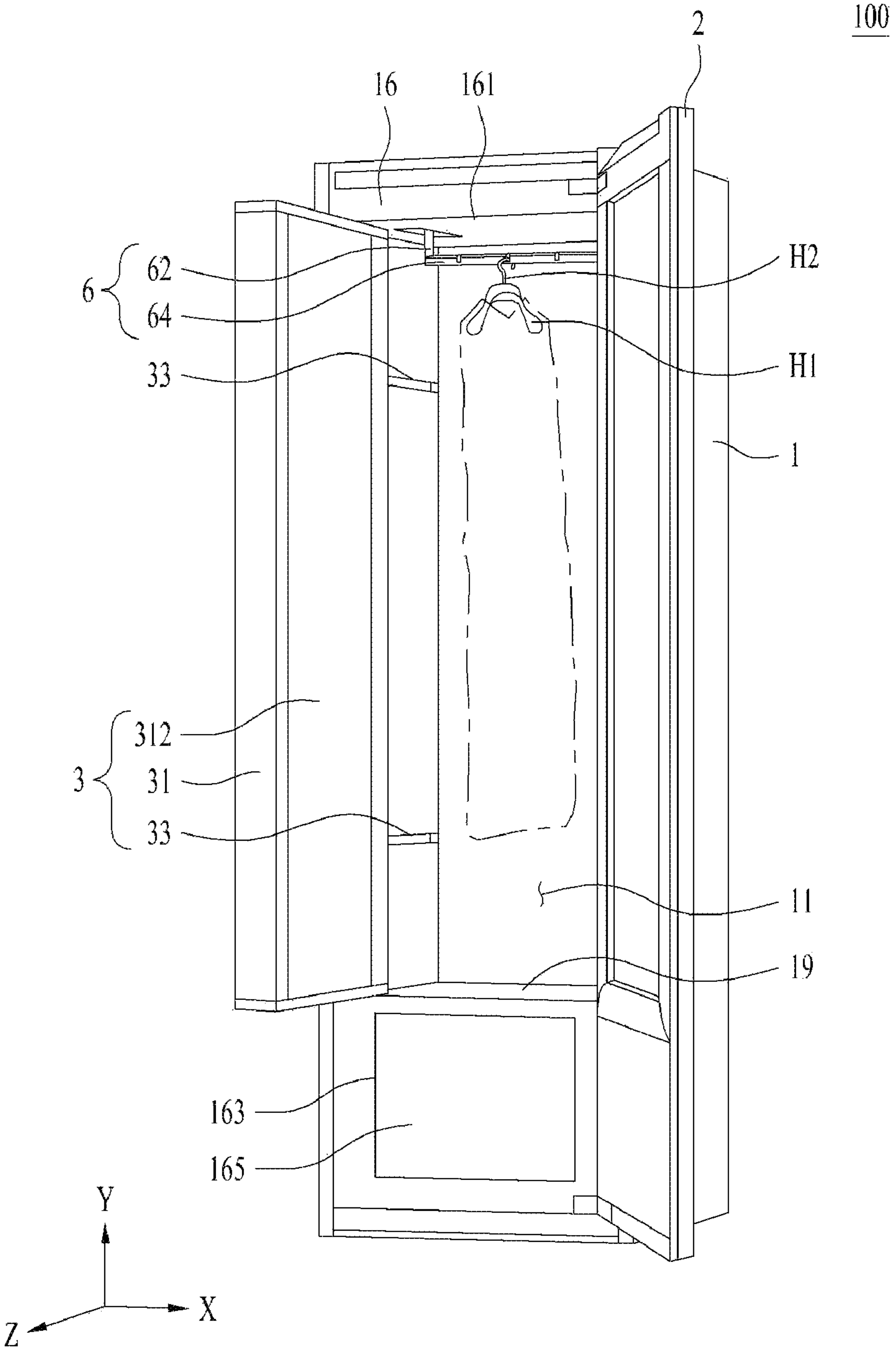
FIGS. 1 and 2 are diagrams illustrating one example of a laundry treatment apparatus according to the present disclosure.

As shown in FIG. 1, the laundry treatment apparatus 100 in accordance with one embodiment of the present disclosure includes a cabinet 1; a laundry receiving space 11 provided in the cabinet 1 and providing a predetermined space for accommodating clothes or laundry; a supply unit configured to supply at least one of air and/or steam or vapors to the laundry receiving space 11; a laundry support unit 6 provided in the laundry receiving space and configured to support the laundry or a hanger H1 having the laundry hung thereon; a door 2 coupled to the cabinet 1 and configured to open and close the laundry receiving space 11; and a presser 3 withdrawable from the laundry receiving space 11 and configured to reinforce the creases made for a design and unfold the winkles made on pants. The laundry receiving space 11 has a predetermined volume that facilitates a state of spreading the laundry and the laundry support unit 6 is provided high enough to maintain the spread state in the laundry receiving space 11.

Figure 2:
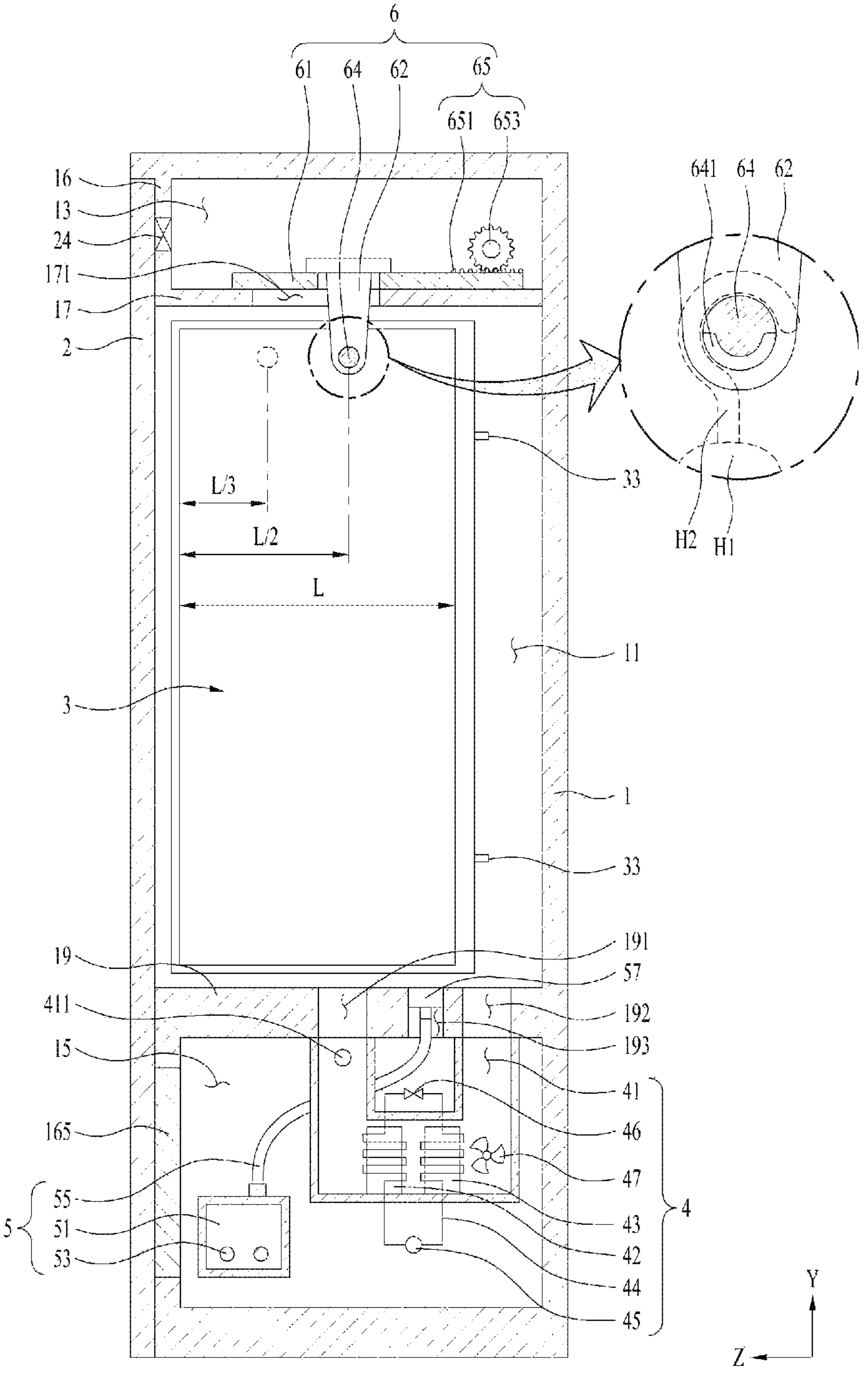

As shown in FIG. 2, the cabinet 1 may include a first chamber (13) provided in an upper area of the laundry receiving space 11; and a second chamber (15) provided in a lower area of the laundry receiving space 11. The first chamber 13 may be the space in which the laundry support unit 6 is installed and the second chamber 15 is the space in which the supply unit 4, 5 is installed.

The first chamber 13 is partitioned off from the laundry receiving space 11 by a first partition wall (17) and the second chamber 15 is partitioned off therefrom by a second partition wall (19). Accordingly, a lower surface of the first partition wall 17 may define an upper surface of the laundry receiving space 11 and an upper surface of the second partition wall 19 may define a lower surface of the laundry receiving space 11.

As shown in FIG. 1, in a front surface 16 of the cabinet 1 there may be provided a laundry introduction opening 161 in communication with the laundry receiving space 11; and a communication opening 163 in communication with the second chamber 15. The laundry introduction opening 161 may be open and closed by the door 2. The communication opening 163 may be opened and closed by a chamber door 165. The chamber door 165 may be drawer retractable from the second chamber 15 or a board type having a lower surface that is rotatable with respect to the front surface 16 of the cabinet by a hinge.

As shown in FIG. 2, the supply unit 4, 5 provided in the second chamber 15 may include an air supply unit 4 configured to supply heated air or unheated air to the laundry receiving space 11; and a moisture supply unit 5 configured to supply heated-vapors (or steam) or unheated vapors to the laundry receiving space 11.

The air supply unit 4 may include a duct 41 provided in the second chamber 15; and a heat exchanger and a fan 47 that are provided in the duct. The duct 41 may be a channel provided to discharge air inside the laundry receiving space 11 towards the heat exchanger and supply the air having passed the heat exchanger towards the laundry receiving space 11.

An outlet hole 191 and an inlet hole 192, which are in communication with the laundry receiving space 11 and the second chamber 15, may be provided in the second partition wall 19. The duct 41 provided in the second chamber 15 may connect the outlet hole 191 and the inlet hole 192 with each other. Accordingly, the fan 47 provided in the duct 41 may be rotated, and the air inside the laundry receiving space 11 may be drawn into the duct 41 via the outlet hole 191 and flow into the laundry receiving space 11 via the inlet hole 192.

The heat exchanger may be provided in a variety of forms provided that it is capable of dehumidifying the air (or removing the moisture contained in the air) drawn into the duct 41 via the outlet hole 191 and heating the dehumidified air. In FIG. 2, the heat exchanger is a heat pump as one example.

In this instance, the heat exchanger may include a refrigerant pipe 44 providing a circulation channel of a refrigerant; a first heat exchanger (42, a heat suction unit) fixed to the refrigerant pipe 44 and located between the outlet hole 191 and the fan 47; a second heat exchanger (43, a heat radiation unit) fixed to the refrigerant pipe 44 and located between the first heat exchanger 42 and the fan 47; an compressor 45 configured to circulate the refrigerant along the refrigerant pipe 44; and an expander 46 configured to lower the pressure of the refrigerant having passed the heat exchanger 43.

The first and second heat exchangers 42 and 43 may be provided in the duct 41. The compressor 45 and the expander 46 may be provided outside the duct 41. The first heat exchanger 42 may be provided as means for extracting heat from the air drawn into the duct 41 and transmitting the heat to the refrigerant circulating inside the refrigerant pipe 44. The refrigerant may be evaporated while passing the first heat exchanger 42 and the air may have moisture contained therein to be condensed while passing the first heat exchanger 42.

The second heat exchanger 43 may be provided as means for transmitting the refrigerant discharged from the compressor 45 to the air having passed the first heat exchanger 42. The refrigerant may be evaporated while passing the second heat exchanger 43 and the air may have moisture contained therein to be condensed while passing the second heat exchanger 43.

The moisture supply unit 5 may include a water storage 51 provided in the second chamber 15 and providing a predetermined space for storing the water; a supply pipe 55 provided to connect the water storage 51 with a nozzle 57; and a heater 53 configured to heat the water stored in the water storage. A moisture inlet hole 193 in communication with is provided in the second partition wall 19. The nozzle 57 may be fixed to the moisture inlet hole 193.

The laundry support unit 6 may include a support bar 64 having a hook H2 of the hanger supported thereto; first and second connecting portions provided to connect both ends of the support bar to the first partition wall 17. In this instance, when the support bar 64 is provided near the center of the upper surface of the laundry receiving space 11, a relatively short user could feel uncomfortable in hooking the hook H2 of the hanger to the support bar 64 or unhook it from the support bar 64.

To solve that, the laundry support unit 6 may be movable along a depth direction of the laundry receiving space (Z-axis direction). As shown in FIG. 2, the laundry support unit 6 may include a supporting part 61, 62, 63, 64 having the hanger H detachably secured thereto; and a conveying part 65 provided to conveying the supporting part along the depth direction (Z-axis direction) of the laundry receiving unit.

The laundry support unit may include a base (61, a Z-axis reciprocating base) configured to reciprocate between the front surface 16 and a rear surface of the cabinet inside the first chamber 13; first and second connecting parts having one ends fixed to the base and free ends located in the laundry receiving space 11; and a support bar 64 having one end fixed to the first connecting part and the other end fixed to the second connecting part to support the hook H2 of the hanger.

The first partition wall 17 may include a first slit 171 and a second slit (not shown) provided to facilitate communication with the first chamber 13 and the laundry receiving space 11. The first connecting part 62 may be inserted in the first slit 171 and the second connecting part (not shown) may be inserted in the second slit.

The first slit 171 may extend from a rear portion of the laundry receiving space towards a front portion having the laundry introduction opening 161 (extend along Z-axis). The second slit may be provided in parallel with the first slit 171. The support bar 64 may be arranged high enough to keep a state where the laundry is spread or unfold in the laundry receiving space 11.

The conveying part 65 may be provided in a variety of forms provided that it is configured to reciprocate between the center of the laundry receiving space 11 and the laundry introduction opening 161. In FIG. 2, the conveying part 65 may include a rack 651 provided in the base 61; a pinion 653 provided in the first chamber 13 and coupled to the rack 651; and a pinion motor configured to rotate the pinion.

The conveying part 65 may convey the support bar 64 when the user inputs a control command via a user input unit (a control command input unit). the control command input unit may control the generation of a control command for moving the support bar 64 towards the laundry introduction opening 161 and another control command for moving the support bar 64 apart from the laundry introduction opening 161 (towards the center of the laundry receiving space) sequentially. The control command input unit may be provided in the door or a predetermined space exposed when the door opens the laundry introduction opening (e.g., the front surface of the cabinet, the laundry receiving space)

Once the user presses the control command input unit in a state where the laundry introduction opening 161 is open, the support bar 64 may move towards the laundry introduction opening 161 such that the user can easily hook the hook H2 of the hanger to the support bar 64. Once the user presses the control command after hooking the hanger H1 to the support bar 64, the support bar 64 may move apart from the laundry introduction opening so as to prevent the hanger H1 from interfering with the door 2.

Meanwhile, the conveying part 65 may be configured move the support bar 64 once the door 2 opens the laundry introduction opening 161. In other words, when the door 2 opens the laundry introduction opening 161, the conveying part 65 may move the support bar 64 towards the laundry introduction opening 161 (in Z-axis direction).

When the door 2 opens the laundry introduction opening 161, a distance from the laundry introduction opening 161 to the center of the support bar 64 may be set to be a third (⅓) or less of the length L (the Z-axis length of the laundry receiving space) of the laundry receiving space with respect to the moving direction of the support bar. That is to facilitate the user's hanging or unhanging the hanger H1 to or from the support bar 64 easily.

Meanwhile, when the door 2 closes the opening 161, a distance from the laundry introduction opening 161 to the center of the support bar 64 may be set to be a half (½) or more of the length L of the laundry receiving space that is in parallel with the moving direction of the support bar. When the support bar 64 is located in the center of the laundry receiving space 11 upon the door 2 closing the opening, it is possible to maximize the size of the hanger H1 having a shape that is symmetrical to the hanger H1 (that is, maximize the width of the laundry that can be accommodated in the laundry receiving space).

A door sensing unit 24 may be provided to sense whether the door 2 opens the laundry introduction opening 161. In FIG. 2, the door sensing unit 24 is provided in the front surface 16 of the cabinet as one example.

The door sensing unit 24 may be a sensor configured to contact with the door once the door 2 closes the laundry introduction opening 161 and separate from the door 2 when the door 2 opens the opening 161.

As shown in FIG. 2, the door sensing unit 24 may be configured to sense the rotating direction of the door 2. Once the door rotates to open the laundry introduction opening 161, the conveying part 65 may move the support bar 64 towards the opening 161. When the door 2 rotates to close the opening 161, the conveying part 65 may move the support bar 64 apart from the opening 161.

The laundry treatment apparatus 100 may further include a lamp configured emit light towards the laundry receiving space 11. The lamp may be provided in the laundry receiving space 11 or the support bar 64.

FIG. 2 illustrates one example of the lamp 641 that is provided in the support bar 64. In this instance, the lamp 641 may be fixed to a lower area with respect to a horizontal line passing the center of the support bar 64. The lamp may be configured to emit light when the door 2 opens the laundry introduction opening 161 and stop the light emitting when the door closes the opening 161.

Figure 3:
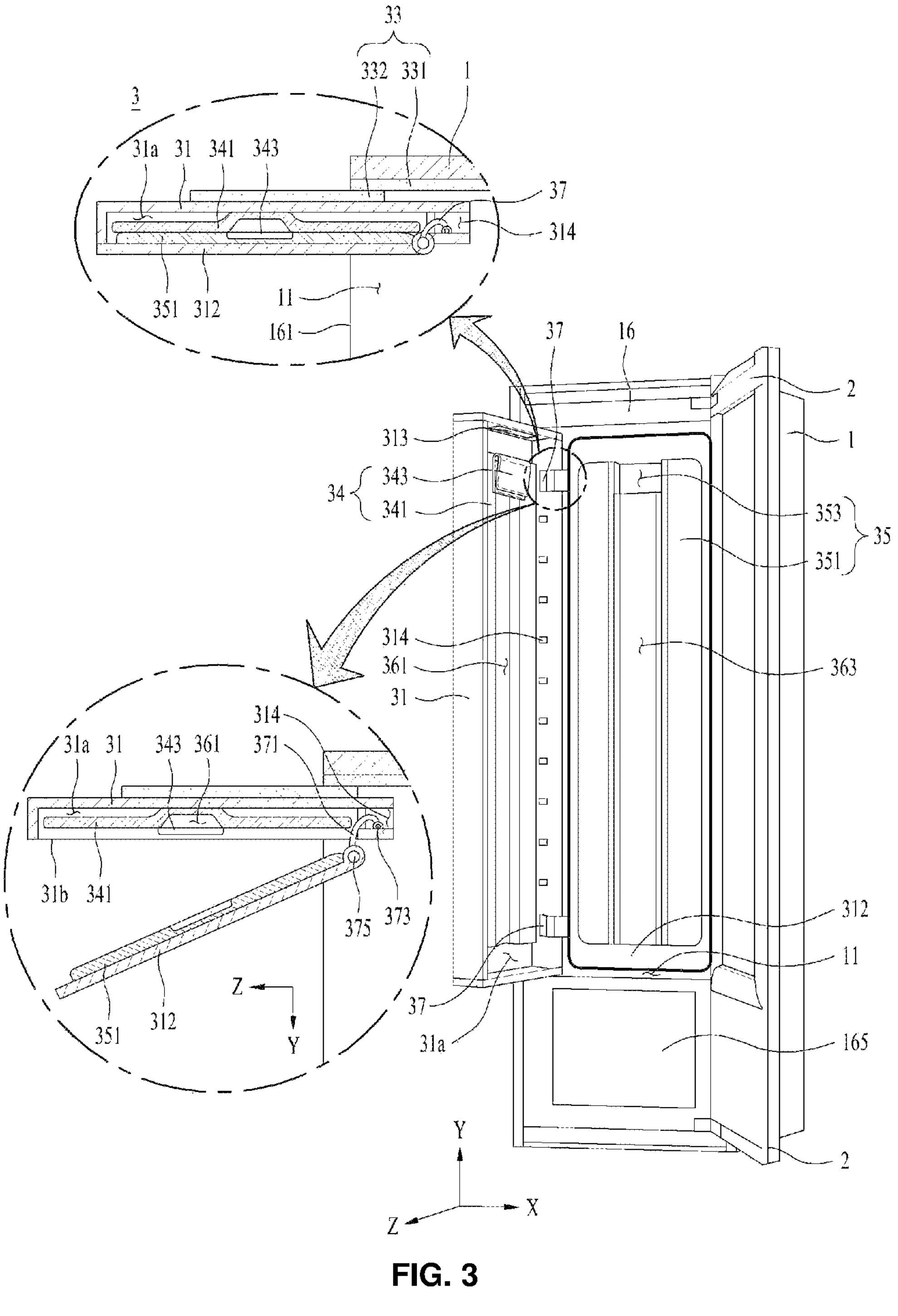
FIG. 3 is a diagram illustrating one example of a pressure provided in the laundry treatment apparatus.

As shown in FIG. 3, the presser 3 may include a housing 31 that is withdrawable from the laundry receiving space 11 via the laundry introduction opening 161 when the door 2 opens the laundry introduction opening 161; a housing chamber 31*a* provided in the housing 31 and providing a predetermined space for accommodating the laundry such as pants; a housing door 312 rotatably coupled to the housing 31 and configured to open and close the housing opening 31*b*; a pants-supporting part 34 provided in the housing chamber 31*a* and having pants secured thereto; and a pants-pressing part 35 provided in the housing chamber 31*a*. Different from what is shown in the drawing, the pants-supporting part 34 may be provided in the housing door 312 and the pants-pressing part 35 may be provided in the housing chamber 31*a*.

The housing 31 may be withdrawable from the laundry receiving space 11 along a housing guide 33. The housing guide 33 may include a fixed frame 331 fixed to the laundry receiving space 11; and a withdrawable frame 332 having one end withdrawable from the fixed frame 331 and the other end fixed to the housing 31.

The pants-supporting part 34 may include laundry securing portion 342 provided in the housing chamber 31*a* and having one end of the pants detachably secured thereto; and a support body 341 provided in the housing chamber 31*a* and configured to support one surface of the pants secured to the laundry securing part portion 343.

One end of the laundry securing portion 343 may be secured to a surface of the support body 341 and a free end may be a clip for pressing the pants to the surface of the support body 341 by using elasticity.

The pants-pressing part 35 may be provided as means for pressing the pants secured to the pants-supporting part 34 towards the support body 341 when the housing door 312 closes the housing opening 31*b*. The pants-pressing part 35 may include a pressing body 351 fixed to the housing door 312. The pressing body 351 may include a securing part receiving groove 353 for accommodating the laundry securing portion 343 when the housing door 312 closes the housing opening 31*b*.

To effectively remove wrinkles from the pants and reinforcingly put a cease on the pants, the presser 3 may further include a housing inlet hole provided to facilitate communication between the housing chamber 31*a* and the laundry receiving space 11. The housing inlet hole 313, 314 may include at least one of first and second inlet holes 313 and 314. The first inlet hole 313 may penetrate an upper surface of the housing and the second inlet hole 314 may penetrate a rear surface of the housing. Accordingly, the vapors and air supplied to the laundry receiving space 11 by the supply unit 3 and 4 may be supplied to the pants via the housing inlet hole 313, 314.

When removing wrinkles from the pants by using the presser 3, unintended wrinkles might be made by a sewing line formed in the pants. To solve such unintended wrinkles, the presser 3 may further include an avoiding groove 361, 363 providing a predetermined space for accommodating such sewing line.

The avoiding groove 361, 363 may include at least one of a support body groove 361 provided along the height of the support body 341 (Y-axis direction or the height of the door); and a pressing body groove 363 provided along the height of the pressing body.

The support body groove 361 may be a groove recessed in a surface of the support body 341 in a direction getting apart from the pressing body 351. The pressing body groove 363 may be a groove recessed in a surface of the pressing body 351 in a direction getting apart from the support body 341.

The housing door 312 may be rotatably coupled to the housing 31 by using a hinge 37. The hinge 37 may include a hinge body 371 provided in a bar shape; a first shaft 373 rotatably coupling one end of the hinge body 371 to the housing; and a second shaft 375 rotatably coupling the other end of the hinge body 371 to the door 312. The hinge body 371 may be provided in the bar shape having one inflection point formed between the first shaft 373 and the second shaft 375.

In case the housing door 312 to the housing 31 via the shaft, unintended wrinkles might be generated by the pants upon the door 312 closing the housing opening 31*b* (the pressing body contacting with the support body). In case of the presser 3 including the hinge having one shaft, an area near the hinge might contact with the pressing body 351 first upon the pressing body 351 pressing the pants towards the support body 341 such that the pants might be twisted. However, when the door 312 is coupled to the housing 31 by using the hinge 37 having two shafts 373 and 375, the wrinkles put on the pants when the pressing body 351 presses the pants towards the support body 341 may be prevented.

Figure 4:
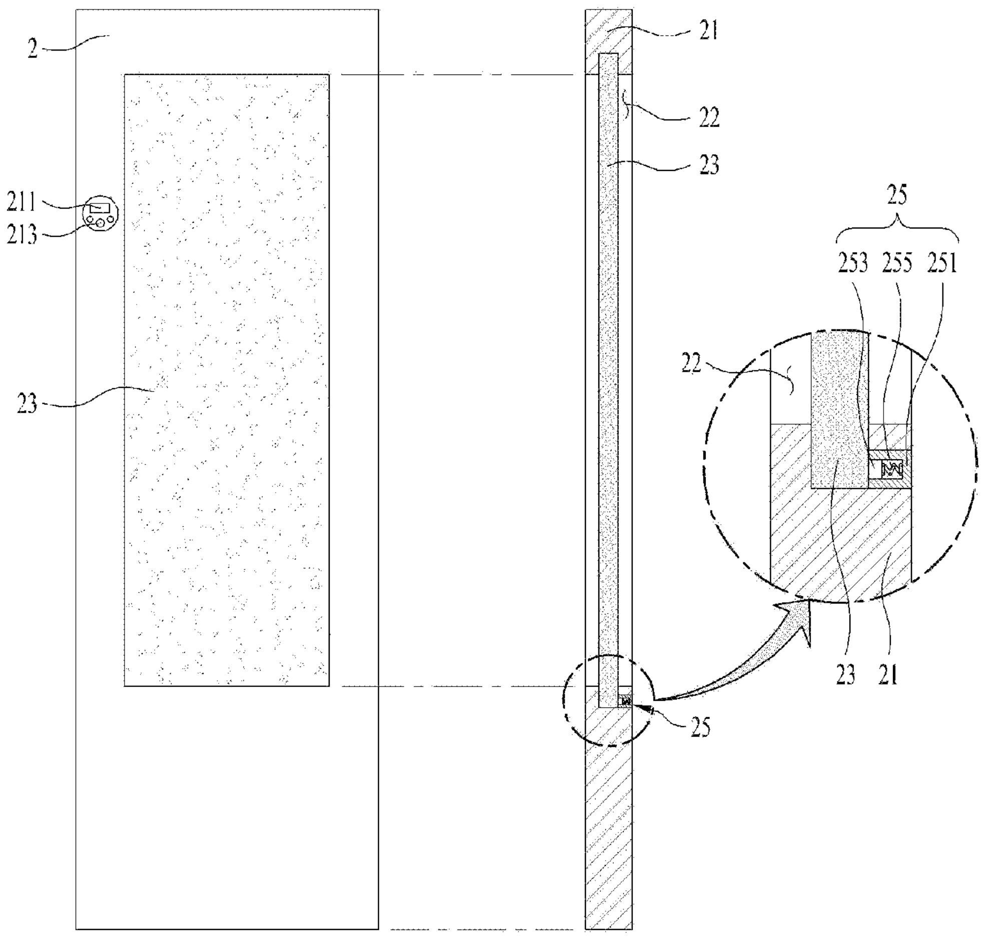
FIG. 4 is a diagram illustrating one example of a door provided in the laundry treatment apparatus.

As shown in FIG. 4, the door 3 provided in the laundry treatment apparatus may include a door body 21 rotatably coupled to the cabinet 1 to open and close the laundry introduction opening 161. In this instance, the door sensing unit 24 may be provided as means for sensing whether the door body 21 opens the laundry introduction opening 161.

The door body 21 may be provided to cover the entire area of the cabinet front surface 16 or some area of the front surface 16. In the former case, the front surface of the laundry treatment apparatus may be defined by the door body 21. In the latter case, the front surface of the laundry treating apparatus may be defined by some area of the cabinet front surface 16 (e.g., the area exposed to the front of the laundry treatment apparatus) and the door body 21.

In the door body 21 may be provided an input unit 213 configured to receive an input of a control command from the user and a display unit 211 configured to display a control command selectable by the user or an execution process of the selected control command.

Meanwhile, the door 2 may include a body through hole 22 penetrating the door body 21; a window 23 provided in the through hole 22; and a knock sensing unit 25 configured to sense at least one of noise (a sound wave transmitted via air) or vibration (transmitted via the window) that is generated when the user knocks on the window 23. Knocking may include tapping.

The window 23 may be made of a transparent or semi-transparent material. The knock sensing unit 25 includes a housing 251 having an accommodating space and fixed to the door body 21; a sensor 253 provided in the accommodating space of the sensor housing and configured to sense the sound wave or vibration; and a pressing portion 255 provided in the accommodating space and configured to press the sensor 253 towards the window 23.

The pressing portion 255 may be provided in a variety of forms provided that it is able to keep the sensor 253 in a contacted state with the window 23. In FIG. 4, a spring is provided as the pressing portion 255 as one example. When the sensor 253 maintains the contacted state with the window 23, the sensor 253 is able to minimize the probability that the user might confuse the vibration generated when the user is tapping the window 23 with the vibration generated in the space where the laundry treatment apparatus is installed. The vibration or sound wave generated when the user is tapping or knocking on the window 23 may be quite larger than the vibration or sound wave transmitted to the window from the space where the laundry treatment apparatus is installed.

Meanwhile, the lamp 641 provided in the laundry receiving space 11 or the support bar 64 may emit light towards the laundry receiving space 11 once the knock sensing unit 25 senses the sound wave or vibration generated when the user is knocking the window 23. In this instance, the laundry treatment apparatus 100 may realize an effect of enabling the inside of the laundry treatment apparatus 100 to be checked from the outside by knocking on the window 23.

The knock sensing unit 25 may be activated only when the door body 21 closes the laundry introduction opening 161. In other words, the lamp 641 may be configured to emit light only when the knock sensing unit 25 senses the sound wave or vibration generated when the user is tapping the window 23 in a state where it is determined that the door body 21 closes the laundry introduction opening 161. In contrast, once it is determined that the door body 21 opens the laundry introduction opening 161, the knock sensing unit 25 may be controlled to be deactivated. Once the user checks the inside of the laundry receiving space 11 upon the door body 21 opening the laundry introduction opening 161, it is not necessary to check the laundry treatment apparatus by using the knock sensing unit 26.

The control unit (not shown) may switch a current activated state of the knock sensing unit 25 into the deactivated state or vice versa. In this instance, the control unit may receive a control signal from the door sensing unit 24 and it may be provided as means for cutting off the electricity supplied to the sensor 253.

The lamp 641 may be configured to emit different color lights according to a progress of the cycle (a dry cycle, a wrinkle-free cycle, cease putting cycle and the like) executed by the laundry treatment apparatus. For that, the laundry treatment apparatus may further include a state sensing unit (411, see FIG. 2) configured to measure humidity or temperatures inside the laundry receiving space 11. When the knock sensing unit 25 senses that an external shock is applied to the window upon the door body 21 closes the laundry introduction opening 161, the lamp 641 may emit respective different lights according to the humidity or temperature measured by the state sensing unit 411. Accordingly, the user is able to visually check the executing process of the selected cycle.

Alternatively, the state sensing unit 411 may be provided as means for measuring a contamination level of the laundry. In other words, the state sensing unit 411 may be provided as means for sensing the smell or the amount of the foreign substances remaining in the laundry. When the knock sensing unit 25 senses that an external force is applied to the window upon the door body 21 closing the laundry introduction opening 161, the lamp 641 may emit respective different color lights according to a contamination level of the laundry measured by the state sensing unit 411.

The state sensing unit configured to measure the amount of the smell remaining in the laundry may be a sensor configured to sense the intensity of smell particles contained in the air inside the laundry receiving space 11. The state sensing unit configured to measure the amount of the foreign substances remaining in the laundry may measure the amount of the foreign substances contained in the air drawn into the duct 41 via the outlet hole 191 or discharged from the duct 41 via the inlet hole 193. Examples of the state sensing unit may include a filter provided in the duct 41 and configured to filter air and a foreign substance sensing unit configured to sense the amount of the foreign substances remaining on the filter.

Figure 5:
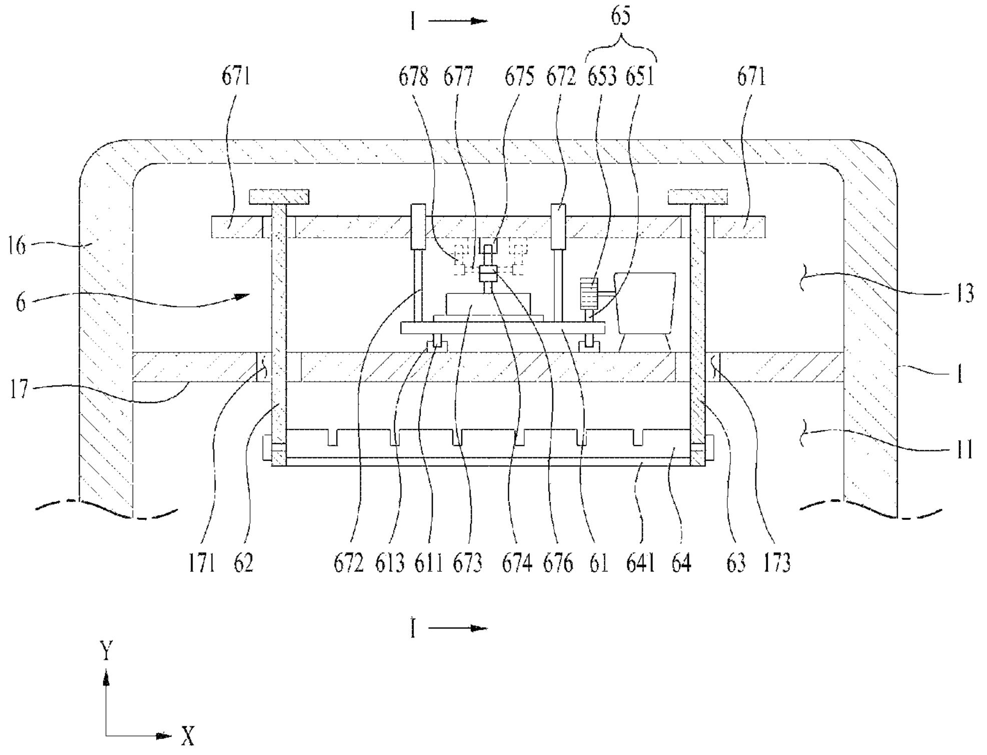
FIGS. 5, 6, and 7 are diagrams illustrating one example of a laundry support unit provided in the laundry treatment apparatus.
Figure 6:
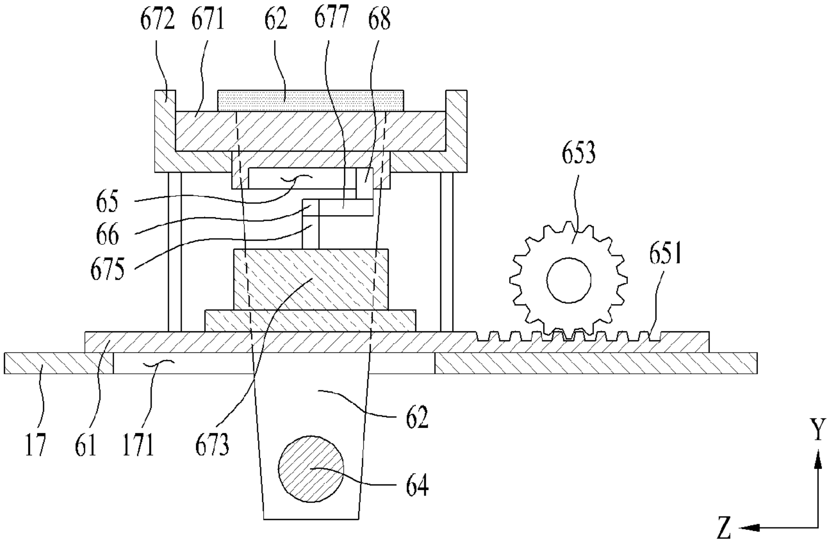

As shown in FIGS. 5 and 6, the support bar 64 provided in the laundry support unit 6 may be configured to reciprocate along a direction (X-axis direction, the width direction of the laundry receiving space and the width direction of the laundry introduction opening) crossing the reciprocating direction (Z-axis direction). In other words, the laundry treatment apparatus 100 according to the present disclosure may further include an actuating part configured to reciprocate the support bar 64 along the orthogonal direction of the reciprocating base.

As shown in FIGS. 5 and 6, the actuating part 67 may include an actuating body 671 supported by an actuating body guide 672 fixed to the base 61; a motor 673 fixed to the base 61; and a converting part 675, 676, 678 configured to convert the rotational force of the motor into a linear motion of the actuating body 671.

The actuating body 671 may reciprocate along the width direction (X-axis direction) of the laundry receiving space 11, while being supported by the actuating body 671. In this instance, the first connecting part 62 and the second connecting part 63 may be secured to both ends of the actuating body 671, respectively.

As shown in the drawing, the converting part may include a slot 675 provided in the actuating body 671; a shaft coupling part 676 fixed to the shaft 674 of the motor, an arm 677 projected from the shaft coupling part along an orthogonal direction with respect to the shaft 674; and a slot inserting part 678 provided in a free end of the arm to be inserted in the slot 675.

Figure 7:
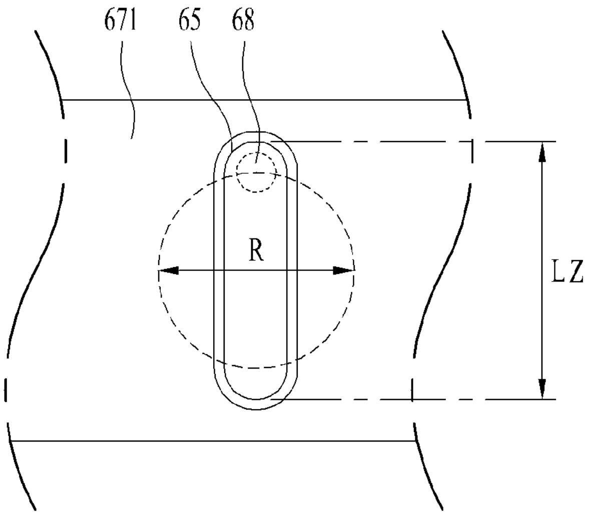

As illustrated in FIG. 7, to facilitate the reciprocation of the actuating body 671 along the width direction (X-axis direction) of the laundry receiving space, the slot 675 may be provided along an orthogonal direction (Z-axis direction)

with respect to a longitudinal direction of the actuating body 671. A diameter R of a locus formed by the slot inserting part may be equal to the length LZ of the slot or less.

The laundry support unit 6 may further include a rail 611 and a rail accommodating groove 613 so as to provide a moving passage of the base 61. In FIG. 5, the rail accommodating groove 613 may be fixed to an upper surface of the first partition wall 17 and the rail 611 may be provided in a bottom surface of the base 61, only to be coupled to the rail accommodating groove 613 as one example.

When air is supplied to the laundry receiving space 11 by actuating the air supply unit 4, the laundry may be dried. While the air is supplied to the laundry receiving space, the support bar 64 is reciprocating along the width direction of the laundry receiving space by the actuating part 67. In this instance, the heat exchanging time between the laundry and air may be effectively reduced (e.g., achieving an effect of shortened drying time).

Meanwhile, when vapors are supplied to the laundry receiving space 11 by actuating the moisture supply unit 5, the laundry treatment apparatus may remove wrinkles from the laundry. While supplying vapors to the laundry receiving space, the support bar 64 may reciprocate along the width direction of the laundry receiving space such that wrinkles can be more effectively removed from the laundry.

Furthermore, when the vapors and the air are supplied to the laundry receiving space simultaneously or sequentially, bad smell may be removed from the laundry. While supplying the vapors and the air to the laundry receiving space, the support bar 64 may reciprocate along the width direction of the laundry receiving space. Accordingly, the time taken to deodorize the laundry may be minimized.

In some embodiments, units discussed herein may be implemented in various forms. For example, an electronic control unit may be provided. A controller may be provided having circuitry configured to perform various functions. An electronic control unit or controller may be provided together with other hardware. Some units may be implemented by a computer.

It will be apparent to those skilled in the art that various modifications and variations can be made in the present disclosure without departing from the spirit or scope of the disclosures. Thus, it is intended that the present disclosure covers the modifications and variations of this disclosure that may be defined by the appended claims and their equivalents.

What is claimed is:

1. A laundry treating apparatus comprising:
- a cabinet;
- a laundry receiving portion provided in the cabinet and providing a predetermined space for accommodating laundry, the laundry receiving portion including a first inner side surface and a second inner side surface opposite to the first inner side surface;
- a support bar disposed widthwise inside the laundry receiving portion to hang a first laundry;
- a laundry introduction opening provided in a front surface of the laundry receiving portion;
- a door coupled to the cabinet and configured to open and close the laundry introduction opening;
- a supply unit configured to supply at least one of air or water to the laundry receiving portion; and
- a presser spaced apart from the support bar and configured to form creases of a second laundry or unfold wrinkles of the second laundry, the presser including:
  - a housing provided on the laundry receiving portion to support and press the second laundry; and
  - a housing guide coupling the housing to only the first inner side surface of the laundry receiving portion and configured to withdraw the housing from the laundry receiving portion and support the housing while the housing is being withdrawn from the laundry receiving portion.

2. The laundry treating apparatus of claim 1, wherein the housing guide is configured to withdraw a part of the housing from the laundry receiving portion into the laundry introduction opening.

3. The laundry treating apparatus of claim 1, wherein the housing is spaced apart from the second inner side surface of the laundry receiving portion.

4. The laundry treating apparatus of claim 1, wherein the housing guide is coupled to the first inner side surface of the laundry receiving portion to be able to slide forward and backward.

5. The laundry treating apparatus of claim 4, wherein the housing is coupled to slide forward and backward on the housing guide.

6. The laundry treating apparatus of claim 1, wherein the door is disposed closer to the second inner side surface of the laundry receiving portion, and
- wherein the housing and the housing guide are spaced apart from the door.

7. The laundry treating apparatus of claim 1, wherein the housing guide includes:
- a fixed frame fixed to the first inner side surface of the laundry receiving portion; and
- a withdrawable frame including a first end withdrawable along the fixed frame in a front-rear direction and a second end fixed to the housing.

8. The laundry treating apparatus of claim 1, wherein the presser further includes a housing door rotatably coupled to the housing to press or fix the laundry inside the housing.

9. The laundry treating apparatus of claim 8, wherein at least one of the housing and the housing door includes a hole for exposing the laundry.

10. The laundry treating apparatus of claim 8, wherein the presser further includes:
- a laundry supporting part provided in any one of the housing and the housing door to affix the second laundry thereto; and
- a laundry pressing part provided in the other of the housing and the housing door.

* * * * *